US007707174B2

(12) United States Patent
Saito et al.

(10) Patent No.: US 7,707,174 B2
(45) Date of Patent: Apr. 27, 2010

(54) CONTENT DISPLAY CONTROL METHOD AND CONTENT DELIVERY SERVER

(75) Inventors: Manabu Saito, Kawasaki (JP); Kaoru Suzuki, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 413 days.

(21) Appl. No.: 11/701,483

(22) Filed: Feb. 2, 2007

(65) Prior Publication Data
US 2007/0250778 A1    Oct. 25, 2007

(30) Foreign Application Priority Data
Feb. 3, 2006  (JP) ............................. 2006-027026
Dec. 28, 2006  (JP) ............................. 2006-354736

(51) Int. Cl.
*G06F 17/00* (2006.01)

(52) U.S. Cl. ...................... 707/609; 707/613; 707/632; 345/1.3; 345/2.3

(58) Field of Classification Search .................... 707/1, 707/5, 2, 10; 345/1.3, 2.3
See application file for complete search history.

(56) References Cited

U.S. PATENT DOCUMENTS

| 6,850,209 | B2 * | 2/2005 | Mankins et al. | ............... 345/1.3 |
| 7,170,624 | B2 * | 1/2007 | Chalstrom et al. | ......... 358/1.15 |
| 2002/0180658 | A1 * | 12/2002 | Saito et al. | ................... 345/1.3 |
| 2004/0117461 | A1 * | 6/2004 | Nakayama et al. | .......... 709/219 |

FOREIGN PATENT DOCUMENTS

| JP | 2002-251159 | 9/2002 |
| JP | 2006-030718 | 2/2006 |

* cited by examiner

*Primary Examiner*—Wilson Lee
*Assistant Examiner*—Angela M Lie
(74) *Attorney, Agent, or Firm*—Mattingly & Malur, P.C.

(57) ABSTRACT

An object of the present invention is to achieve an efficient and low-cost processing for switching contents on a display according to travel areas, time frames and vehicle attributions of a transportation object. To this end, the present invention provides a system constituted of a content delivery server and the e-paper. The content delivery server includes: an designation receiving unit for storing schedule designation information in a database of content/schedule information; a transportation object specification unit for specifying a transportation object according to attribute information of an e-paper; a travel schedule specification unit for specifying information on a scheduled travel time in an display area; an interval-period computing unit for associating a display period of content with a display area; a travel area specification unit for storing information on a travel area corresponding to the display area; a content setting unit for associating the information on the travel area with attribute information of the content; and a delivery processing unit for transmitting, to the e-paper, display schedule information and the content. The e-paper includes: a data obtaining unit for obtaining contents and display schedule information from the content delivery server; and a display processing unit for switching the contents to be output on a display panel according to the display schedule of the contents.

16 Claims, 8 Drawing Sheets

TIMETABLE INFORMATION (TRAVEL SCHEDULE DB)

| TRAIN NUMBER | STATION INFORMATION | ARRIVAL TIME | DEPARTURE TIME |
|---|---|---|---|
| A00003 | SHINAGAWA | 6:50 | 6:52 |
| A00003 | KAWASAKI | 7:13 | 7:15 |
| ... | ... | ... | ... |
| A00013 | TOKYO | — | 19:20 |
| A00013 | SHINYOKOHAMA | 19:34 | 19:36 |
| ... | ... | ... | ... |
| A00092 | YOKOHAMA | 23:00 | 23:10 |
| A00092 | SHINAGAWA | 23:34 | 23:38 |
| ... | ... | ... | ... |

VEHICLE INFORMATION (TRANSPORTATION OBJECT DB)

| TRAIN NUMBER | VEHICLE NUMBER | E-PAPER ID |
|---|---|---|
| A00003 | X 00021 | 00001 |
| A00003 | X 00021 | 00002 |
| A00003 | ... | ... |
| A00003 | X 00031 | 00011 |
| A00003 | X 00031 | 00012 |
| A00003 | ... |  |
| A00003 | X 00041 | 00021 |
| A00003 | X 00041 | 00022 |
| ... | ... | ... |

CONTENT DB

| CONTENT NAME | ATTRIBUTE 1 | ATTRIBUTE 2 | FILE |
|---|---|---|---|
| CORPORATE AD 1 | FULL COLOR | A 4 | c:\cont・・・ |
| CORPORATE AD 2 | FULL COLOR | A 4 | c:\cont・・・ |
| CORPORATE AD 3 | 8 COLOR | B 5 | c:\cont・・・ |
| CORPORATE AD 4 | MONOCHROME | A 4 | c:\cont・・・ |
| OFFICIAL JOURNAL | MONOCHROME | A 4 | c:\cont・・・ |
| ANNOUNCEMENT OF CITY | 8 COLOR | B 5 | c:\cont・・・ |
| NEWSFLASH | FULL COLOR | A 4 | c:\cont・・・ |
| STANDARD IMAGE | 8 COLOR | A 4 | c:\cont・・・ |
| ... | ... | ... | ... |

CONTENT/SCHEDULE INFORMATION (TIME ZONE) 128

| E-PAPER ID | DISPLAY TIME ZONE | CONTENT 1 | DISPLAY TIME ZONE | CONTENT 2 | ... |
|---|---|---|---|---|---|
| 00011 | 6:00-12:00 | CORPORATE AD 1 | 12:00-18:00 | CORPORATE AD 2 | ... |
| 00012 | 6:00-8:00 | WOMEN-ONLY CAR | 8:00-15:00 | PRIORITY SEAT | ... |
| 00013 | 6:00-12:00 | CORPORATE AD 3 | 12:00-18:00 | CORPORATE AD 4 | ... |
| 00014 | 5:30-6:30 | SMOKING | 6:30-10:00 | SMOKING | ... |
| 00015 | 18:00-21:00 | WOMEN-ONLY CAR | 21:30-23:00 | FIRST-CLASS CAR | ... |
| ... | ... | ... | ... | ... | ... |

*1: CONTENT INFORMATION IS IMAGE DATA.

FIG. 3A

CONTENT/SCHEDULE INFORMATION (AREA) 128

| E-PAPER ID | DISPLAY AREA | CONTENT INFORMATION 1 | DISPLAY AREA | CONTENT INFORMATION 2 | ... |
|---|---|---|---|---|---|
| 00001 | KAWASAKI-SHINAGAWA | CORPORATE AD 1 | SHINAGAWA-TOKYO | CORPORATE AD 2 | ... |
| 00002 | TOKYO-SHINYOKOHAMA | CORPORATE AD 3 | SHINYOKOHAMA-NAGOYA | CORPORATE AD 4 | ... |
| 00003 | TOKYO-SHINAGAWA | WOMEN-ONLY CAR | SHINAGAWA-YOKOHAMA | FIRST-CLASS CAR | ... |
| 00004 | TOKYO-ODAWARA | SMOKING | ODAWARA-SHIZUOKA | SMOKING | ... |
| 00005 | SHINOSAKA-NAGOYA | PRIORITY SEAT | NAGOYA-TOKYO | CORPORATE AD 5 | ... |
| ... | ... | ... | ... | ... | ... |

*1: CONTENT INFORMATION IS IMAGE DATA.

FIG. 3B

DELIVERY SCHEDULE INFORMATION  129

| E-PAPER ID | RESCHEDULE INTERVAL | DISPLAY PERIOD 1 | DISPLAY PERIOD 2 | DISPLAY PERIOD 3 | ... |
|---|---|---|---|---|---|
| 00001 | 24 HOURS | 23 MIN. | 15 MIN. | 13 MIN. | ... |
| 00002 | 12 HOURS | 120 MIN. | 420 MIN. | 120 MIN. | ... |
| 00003 | 24 HOURS | 360 MIN. | 360 MIN. | 360 MIN. | ... |
| 00004 | 24 HOURS | 60 MIN. | 210 MIN. | 60 MIN. | ... |
| 00005 | 24 HOURS | 360 MIN. | 120 MIN. | 360 MIN. | ... |
| ... | ... | ... | ... | ... | ... |

FIG. 4A

DELIVERY CONTENT INFORMATION  130

| E-PAPER ID | SIZE | TYPE | CONTENT INFORMATION 1(*1) | CONTENT INFORMATION 2 | CONTENT INFORMATION 3 | ... |
|---|---|---|---|---|---|---|
| 00001 | A4 | FULL COLOR | CORPORATE AD 1 | CORPORATE AD 2 | ... | ... |
| 00002 | A4 | FULL COLOR | CORPORATE AD 3 | CORPORATE AD 4 | ... | ... |
| 00003 | A4 | 8 COLOR | WOMEN-ONLY CAR | FIRST-CLASS CAR | ... | ... |
| 00004 | B5 | 8 COLOR | SMOKING | SMOKING | ... | ... |
| 00005 | B5 | MONOCHROME | PRIORITY SEATING | CORPORATE AD 5 | ... | ... |
| ... | ... | ... | ... | ... | ... | ... |

*1: CONTENT INFORMATION IS IMAGE DATA.

FIG. 4B

DELIVERY SCHEDULE DETAIL INFORMATION  5

| E-PAPER ID | RESCHEDULE INTERVAL | DISPLAY PERIOD 1 | DISPLAY PERIOD 2 | DISPLAY PERIOD 3 | ... |
|---|---|---|---|---|---|
| 00001 | 24 HOURS | 23 MIN. | 15 MIN. | 13 MIN. | ... |

FIG. 4C

DELIVERY CONTENT DETAIL INFORMATION  6

| E-PAPER ID | SIZE | TYPE | CONTENT INFORMATION 1(*1) | CONTENT INFORMATION 2 | CONTENT INFORMATION 3 | ... |
|---|---|---|---|---|---|---|
| 00001 | A4 | FULL COLOR | CORPORATE AD 1 | CORPORATE AD 2 | ... | ... |

*1: CONTENT INFORMATION IS IMAGE DATA.

FIG. 4D

CONTENT DISPLAY CONTROL METHOD AND CONTENT DELIVERY SERVER

CROSS-REFERENCE TO RELATED APPLICATIONS

This application claims priority based on Japanese Patent Applications, No. 2006-27026 filed on Feb. 3, 2006 and No. 2006-354736 filed on Dec. 28, 2006, the entire contents of which are incorporated herein by reference.

BACKGROUND OF THE INVENTION

1. Field of the Invention

The present invention relates to a content delivery system, a content delivery method, a content delivery server and electric paper (e-paper). Specifically, the present invention relates to a method of scheduling contents to be delivered to e-paper displays (hereinafter, simply referred to as "e-paper") placed in a vehicle body of a railway vehicle, a bus or the like which travels according to information on a time schedule. In particular, the present invention relates to a technique which makes it possible to make a delivery schedule so that contents, whose display areas are registered, can be delivered to each of e-papers mounted on a vehicle body according to information on a travel timetable.

2. Related Art

A technique for displaying advertisement information (ad-information) in a vehicle is disclosed, for example, in Japanese Patent Application Laid-open Publication No. 2002-251159. In the technique described in this patent document, ad-information is transmitted from an ad-maker (a server), and then is stored in an ad-information source device. Concurrently, the ad-information is transmitted to a vehicle which is capable of traveling. In addition, while transmitting the ad-information as above, a vehicle-side system displays the ad-information to be shown to passengers, the ad-information related to an area where the vehicle is currently traveling.

Currently, as advertising media in a vehicle body, paper media are mainly used for adverting display. In a case of the paper advertisement, however, someone has to replace sheets of advertising paper with other sheets by hand after a display period of the advertising paper passes, and there has been a problem that this replacement work is so troublesome that expense is required for time and effort. In consideration of this problem, a technique has been known for displaying ad-information transmitted from an ad-maker on an electronic advertising screen or the like placed in a vehicle. This technique has been proposed as a transportation advertising system or the like for the purpose of providing a transportation advertising system capable of improving the effect of advertisements remarkably by effectively showing ad-information typified by folded leafs, for example, to business commuters, student commuters and other passengers (See Japanese Patent Application Laid-open Publication (JPA) No. 2002-251159). The proposed transportation advertising system includes: an ad-information server for transmitting ad-information via a network; an ad-information source apparatus for storing the ad-information, while transmitting the ad-information to a vehicle capable of traveling; and a vehicle-side apparatus, which is installed in the vehicle, and which is for displaying ad-information related to an area where the vehicle is currently traveling.

Recently, in addition to the foregoing paper media, LED display devices and monitor displays have been used as advertising media or information displaying media in a vehicle. Contents displayed via these media are switched according to an order (display period, transportation area and time frame) of an advertising client and the like. In a case of the paper media, someone has to do replacement work by hand according to the order, and thereby it is difficult to change the contents of advertisements flexibly and timely by following complex conditions such as periods, areas, time frames and vehicles for displaying the contents. Moreover, in the case of JPA 2002-251159, a liquid crystal display is used as a display media. However, when a liquid crystal display, an LED display device or a monitor display is used, power needs to be supplied to the display medium itself. This brings about a problem that it is necessary to consider a wiring from a power source to a display in a vehicle, and an installation location of the display.

In addition, advertisement notices (ad-notices) displayed on the respective displays mutually have the same contents, unlike the advertisement via the paper media with which every ad-notice shows a different content. Accordingly, various kinds of ad-notices cannot be provided by using advertisement notices of still images, without considering a time factor.

An e-paper is a power-saving display medium which is as thin as a sheet of paper. Use of the e-paper, instead of a liquid crystal display, does not require the consideration of a wiring for power supply and an installation location, but leads to the following problems.

The e-paper employs a PULL type information control in which the e-paper accesses a server which transmits contents, and thereby obtains information. The reason why the e-paper employs the PULL type information control is that the e-paper has a structure in which power is usually supplied only to units needed for the e-paper to display contents for the purpose of saving power. Accordingly, a communication unit or the like is usually powered off. In this state, the communication unit or the like is powered on in order to obtain the information only at a PULL timing.

As a result, even though information is transmitted from a content delivery server in a PUSH manner, the power is not always supplied to the communication unit or the like of the e-paper sufficiently enough to allow the communication unit or the like to operate. For this reason, unlike the publicly-known example, the PUSH type content delivery method cannot be applied, without modification, to a case of the e-paper. In accordance with PUSH type information control, the content delivery server is required to generate information for causing contents to be displayed on the e-paper.

In addition, another problem is that the same contents are uniformly displayed in all the transportation routes, when advertisements are displayed in vehicles. Instead, it is necessary to display advertisements suitable for traveling areas and also for traveling time frames, since such display can enhance the effect of the advertisements.

SUMMARY OF THE INVENTION

Accordingly, an object of the present invention is to provide a content display control method and a content delivery system for controlling an e-paper under power-saving control, for delivering contents to be displayed, and for controlling a display operation of the e-paper.

Another object of the present invention is to provide a content delivery system, a content delivery method, a content delivery server and an e-paper display, which achieve processing of switching display contents according to transportation areas, time frames and vehicle attributes of a transportation object.

The objects of the present invention are achieved by the following aspects of the present invention.

A first aspect of the present invention is a method and a system for transmitting, from a content delivery server to an e-paper, a content and a rescheduling time at which the e-paper is to make a transmission request, in a case where the e-paper makes a transmission request. By using this first aspect, the content and a PULL timing appropriate for a transportation object can be set in the e-paper.

A second aspect of the present invention is a method and a system for setting a rescheduling time in an e-paper mounted on a transportation object, according to a travel schedule such as a timetable of the transportation object, as a PULL timing setting specified for the transportation object. Note that this disclosure uses a railway as an example of the transportation object. Meanwhile, the present invention is also applicable to another type of transportation object, for example, a bus or an airplane.

A third aspect of the present invention is a method and a system for setting a rescheduling time according to stations at which a transportation object makes a stop in a travel schedule, or designation of a station.

A fourth aspect of the present invention is a method and a system for setting a rescheduling time to be a time after departure from a final destination of a transportation object in a travel schedule, that is, a time when the transportation object enters a deposit.

By using the second to fourth aspects, it is possible to control display of contents so that the e-paper can display the contents according to the travel schedule. For example, if the rescheduling time is set to be a time at which the transportation object makes a stop at a certain station, a new content can be supplied to the e-paper from a system installed in the station. If the rescheduling time is set to be a time when the transportation object enters the deposit, content can be set at the deposit.

A fifth aspect of the present invention is a method and a system for determining a plurality of contents and a display period of each of the contents. This aspect makes it possible to control display of contents which the e-paper displays up to the rescheduling time. If display periods are designated with areas, for example, for a train which travels along a long route, content appropriate for an area where the train is currently traveling can be provided to passengers by setting display areas. In addition, if display periods are designated with times, it is possible to control display of contents according to time frames. Thereby, news information in the morning, and restaurant information in the evening, for example can be provided.

It is obvious that the objects of the present invention can be also achieved by using other aspects disclosed in preferred embodiments of the present invention. The content delivery system of the present invention which solves the foregoing problems includes a content delivery server and an e-paper mounted on a transportation object. The content delivery server includes a travel schedule database, a transportation object database, a content database, a designation receiving unit, a transportation object specification unit, a travel schedule specification unit, an interval-period computing unit, a travel area specification unit, a content setting unit and a delivery processing unit. The travel schedule database stores information on scheduled travel times of the transportation object along a travel route, the transportation object database stores attribute information on the transportation object and attribute information on the e-paper mounted on the transportation object in association with each other, and the content database stores contents to be displayed on the e-paper. The designation receiving unit receives schedule designation information from an input interface, and stores this information in a content/schedule information database. Here, the schedule designation information includes the attribute information on the e-paper mounted on the transportation object, attribute information on contents for display on the e-paper, and information on display areas of the respective contents corresponding to travel areas of the transportation object. The transportation object specification unit reads the schedule designation information from the content/schedule information database; performs processing for specifying the transportation object in the transportation object database according to the attribute information of the e-paper in the schedule designation information; and then stores, in a working storage device, the attribute information on the transportation object thus specified. The travel schedule specification unit reads the attribute information on the transportation object specified in the specification processing, from the working storage device; reads information on display areas designated for this transportation object in the schedule designation information, from the content/schedule information database; performs processing for extracting scheduled travel times corresponding to the display areas along the travel route in the travel schedule database; and then stores, in the working storage device, information on the scheduled travel times corresponding to the display areas, which are extracted in the extracting process. The interval-period computing unit reads the information on the scheduled travel times corresponding to the display areas, from the working storage device; computes the difference between each pair of two successive scheduled travel times; and then stores the computed difference, as a content display period, in a delivery schedule database in association with the display areas. The travel area specification unit reads the attribute information on the transportation object specified in the specification processing, from the working storage device; reads information on the display areas designated for the transportation object in the schedule designation information from the content/schedule information database; performs processing for extracting travel areas corresponding to the display areas along the travel route in the travel schedule database; and then stores, in the working storage device, information on the travel areas corresponding to the display areas extracted in the extracting processing. The content setting unit reads the information on the travel areas from the working storage device; and stores this information in the delivery content database in association with the attribute information on each of the contents designated in the schedule designation information. The delivery processing unit accepts an access from the e-paper via the wireless network; specifies corresponding records in the delivery schedule database and in the delivery content database as delivery schedule information, according to the e-paper ID transmitted from the e-paper at the time of the access; specifies contents in the content database specified in the display schedule information; and then transmits the display schedule information and the contents to the e-paper. On the other hand, the e-paper includes: a clock function unit for computing an arrival of a date and time; a wireless communication unit; a content storage unit for storing contents for display; a schedule storage unit for storing the display schedule of the contents; a data obtaining unit; and a display processing unit. The wireless communication unit performs processing for data communications with the content delivery server by accessing the wireless network. The data obtaining unit detects an arrival of a predetermined date and time by using the clock function unit; makes a request to the content delivery server accessed via the wireless communication unit, for contents for display and a display schedule information of the contents for display; and then stores the contents and the display schedule information, which are obtained from the content delivery server by making the request, in the content storage unit and in the schedule storage unit, respectively. The display processing unit performs processing for reading the contents from the content storage unit according to the display schedule held in the schedule storage unit, and information on the arrival of the date and time detected by the clock function unit. Then, the display processing unit performs processing for switching the contents from one to another to be output on a display panel according to a display schedule.

Alternatively, a content delivery system of the present invention includes a different content delivery server and an e-paper mounted on a transportation object. The content delivery server includes a transportation object database, a content database, a designation receiving unit, an interval-period computing unit, a content setting unit and a delivery processing unit. The transportation object database stores attribute information on a transportation object and attribute information on the e-paper mounted on the transportation object in association with each other. The content database stores contents to be displayed on thee-paper. The designation receiving unit receives schedule designation information from an input interface, and then stores this information in the content/schedule information database. Here, the schedule designation information includes the attribute information on the e-paper mounted on the transportation object, attribute information on the contents for display on the e-paper, and information on time frames each for displaying content on the e-paper. The interval-period computing unit reads the schedule designation information from the content/schedule information database; computes a display period in each time frame according to information on display time frames included in the schedule designation information; and stores the display information, as a content display period, in the delivery schedule database in association with the display time frame. The content setting unit stores the attribute information on each of the contents designated in the schedule designation information and information on the display time frame in the delivery content database in association with each other. The delivery processing unit accepts an access from the e-paper via a wireless network; specifies, as delivery schedule information, corresponding records in the delivery schedule database and in the delivery content database according to the e-paper ID transmitted from the e-paper at the time of the access; specifies, in the content database, contents specified in the display schedule information; and transmits the display schedule information and the contents to the e-paper. On the other hand, the e-paper includes: a clock function unit for computing an arrival of a date and time; a wireless communication unit; a content storage unit for storing contents for display; a schedule storage unit for storing the display schedule of the contents; a data obtaining unit; and a display processing unit. The wireless communication unit performs processing for data communications with the content delivery server by accessing a wireless network. The data obtaining unit detects an arrival of a predetermined date and time by using the clock function unit; makes a request to the content delivery server accessed via the wireless communication unit, for contents for display and display schedule information of the contents for display; and then stores the contents and the display schedule information, which are obtained from the content delivery server by making the request, in the content storage unit and in the schedule storage unit, respectively. The display processing unit performs processing for reading the contents from the content storage unit according to the display schedule in the schedule storage unit, and information on the arrival of the date and time detected by the clock function unit. Then, the display processing unit performs processing for switching the read-out contents from one to another to be output on a display panel according to the display schedule.

Additionally, it is preferable that the content delivery system further include a rescheduling information obtaining unit. The rescheduling information obtaining unit receives information on a time when the e-paper accesses the content delivery server next time (hereinafter, this access is referred to as a "re-access"), and stores the thus received information in the delivery schedule database, in association with the e-paper. In this case, it is preferable that the e-paper further include a re-access instruction unit. The re-access instruction unit detects an arrival of the re-access time by using the clock function unit according to the re-access time information included in the display schedule information, and then issues an instruction to the data obtaining unit to access the content delivery server.

The content delivery method for the present invention is a method of delivering contents from a content delivery server to an e-paper mounted on the transportation object, the server and the e-paper being connected to each other via a wireless network. The content delivery method of the present invention has the following features. The content delivery server includes a travel schedule database, a transportation object database, and a content database. The travel schedule database stores information on a scheduled travel time of a transportation object along a travel route. The transportation object database stores attribute information on the transportation object and attribute information on an e-paper mounted on the transportation object, in association with each other. The content database stores contents to be displayed on thee-paper. The content delivery server receives schedule designation information from an input interface, and then stores this information in a content/schedule information database. Here, the schedule designation information includes the attribute information on the e-paper mounted on the transportation object, attribute information on contents for display on the e-paper, and information on display areas of contents corresponding to travel areas of the transportation object. Thereafter, the content delivery server reads the schedule designation information from the content/schedule information database; performs processing for specifying a transportation object in the transportation object database according to attribute information on the e-paper included in the schedule designation information; and stores, in a working storage device, the attribute information on the thus specified transportation object. Then, the content delivery server reads the attribute information on the transportation object specified in the specification processing, from the working storage device; reads information on the display area designated for the transportation object in the schedule designation information from the content/schedule information database; performs processing for extracting scheduled travel times corresponding to the display areas in the travel route in the travel schedule database; and stores, in the working storage device, the information on the scheduled travel times corresponding to the display areas which are extracted in the above extracting process. Subsequently, the content delivery server reads the information on the scheduled travel times corresponding to the display areas, from the working storage device; computes the difference between each pair of two successive scheduled travel times; and stores this difference as a content display period in association with the display areas, in the delivery schedule database. Then, the content delivery server reads, from the working storage device, the attribute information on the transportation object specified in the specification processing; reads information on the display area designated for the transportation object with the schedule designation information, from the content/schedule information database; performs processing for extracting travel areas corresponding to the display areas in the travel route in the travel schedule database; and stores, in the working storage device, information on the travel areas corresponding to the display areas extracted in the extracting processing. After that, the content delivery server reads information on the travel areas, from the working storage device, and stores this read information in delivery content database in association with the attribute information on the contents designated in the schedule designation information. Subsequently, the content delivery server accepts an access from the e-paper via the wireless network; specifies, as display schedule information, corresponding records in the delivery schedule database and in the delivery content database according to the e-paper ID transmitted from the e-paper at the time of the access; specifies, in the content database, content corresponding to each of the contents specified in the display schedule information; and then transmits the display schedule information and the content to the e-paper. On the other hand, the e-paper includes: a clock function unit for computing an arrival of a date and time; a wireless communication unit performing processing for data communications with the content delivery server by accessing the wireless network; a content storage unit for storing contents for display; and a schedule storage unit for storing a display schedule of the contents. The e-paper detects an arrival of a predetermined date and time by using the clock function unit; makes a request to the content delivery server accessed via the wireless communication unit, for contents for display and the display schedule information of the contents for display; stores the contents and the display schedule information, which are obtained from the content delivery server by making the request, in the content storage unit and the schedule storage unit, respectively. Then, the e-paper performs processing of reading the contents from the content storage unit according to the display schedule in the schedule storage unit and information on the arrival of the date and time detected by the clock function unit. Thereafter, the e-paper performs processing of switching the contents from one to another to be output on a display panel according to the display schedule.

In addition, the content delivery method of the present invention is a method for delivering contents from a content delivery server to an e-paper mounted on the transportation object, the server and the e-paper being connected to each other via a wireless network. The content delivery method of the present invention has the following features. The content delivery server includes transportation object database and a content database. The transportation object database stores attribute information on the transportation object and on an e-paper mounted on the transportation object, in association with each other. The content database stores contents to be displayed on thee-paper. The content delivery server receives schedule designation information from an input interface, and then stores this information in a content/schedule information database. Here, the schedule designation information includes the attribute information on the e-paper mounted on the transportation object, attribute information on contents for display on the e-paper, and information on time frames for displaying contents on the e-paper. Then, the content delivery server reads the schedule designation information from the content/schedule information database; computes a display period in each time frame according to information on display time frames held in the schedule designation information; and stores this display period, as a content display period, in the delivery schedule database in association with the display time frame. The content delivery server also stores the attribute information on the content and information on the display time frame, which are designated in the schedule designation information, in the delivery content database in association with each other. Next, the content delivery server accepts an access from the e-paper via the wireless network, and specifies corresponding records in the delivery schedule database and in the delivery content database according to the e-paper ID transmitted from the e-paper at the time of the access. Then, the content delivery server specifies contents specified in the display schedule information, and transmits the display schedule information and the contents to the e-paper. On the other hand, the e-paper includes: a clock function unit for computing an arrival of a date and time; a wireless communication unit performing processing for data communications with the content delivery server by accessing the wireless network; a content storage unit for storing contents for display; and a schedule storage unit for storing a display schedule of the contents. The e-paper detects an arrival of a predetermined date and time by using the clock function unit; makes a request to the content delivery server accessed via the wireless communication unit, for contents for display and the display schedule information of the contents for display; stores the contents and the display schedule information, which are obtained from the content delivery server by making the request, in the content storage unit and the schedule storage unit, respectively. Then, the e-paper performs processing of reading the contents from the content storage unit according to the display schedule information in the schedule storage unit and information on the arrival of the date and time detected by the clock function unit. Thereafter, the e-paper performs processing of switching the contents from one to another to be output on a display panel according to the display schedule.

Moreover, a content delivery server of the present invention includes: a travel schedule database, a transportation object database, a content database, a designation receiving unit, a transportation object specification unit, a travel schedule specification unit, an interval-period computing unit, a travel area specification unit, a content setting unit and a delivery processing unit. The travel schedule database stores information on scheduled travel times of the transportation object along a travel route, the transportation object database stores attribute information on the transportation object and attribute information on the e-paper mounted on the transportation object, in association with each other, and the content database stores contents for display on the e-paper. The designation receiving unit receives schedule designation information from an input interface, and stores this information in a content/schedule information database. Here, the schedule designation information includes the attribute information of the e-paper mounted on the transportation object, attribute information on contents for display on the e-paper, and information on display areas of the respective contents corresponding to travel areas of the transportation object. The transportation object specification unit reads the schedule designation information from the content/schedule information database; performs processing for specifying the transportation object in the transportation object database according to the attribute information on the e-paper included in the schedule designation information; and then stores, in a working storage device, attribute information on the thus specified transportation object. The travel schedule specification unit reads, from the working storage device, the attribute information on the transportation object specified in the specification processing; reads information on display areas designated for this transportation object with the schedule designation information, from the content/schedule information database; performs processing for extracting scheduled travel times corresponding to the display areas along the travel route in the travel schedule database; and then stores, in the working storage device, information on the scheduled travel times corresponding to the display areas, which are extracted in the extracting process. The interval-period computing unit reads, from the working storage device, the information on the scheduled travel times corresponding to the display areas; computes the difference between each pair of two successive scheduled travel times; and then stores the computed difference as a content display period in a delivery schedule database in association with the display areas. The travel area specification unit reads, from the working storage device, the attribute information on the transportation object specified in the specification processing; reads information on the display areas designated for the transportation object with the schedule designation information from the content/schedule information database; performs processing for extracting travel areas corresponding to the display areas along the travel route in the travel schedule database; and then stores, in the working storage device, information on the travel areas corresponding to the display areas extracted in the extracting processing. The content setting unit reads the information on the travel areas from the working storage device; and stores this information in the delivery content database in association with the attribute information on each of the contents designated in the schedule designation information. The delivery processing unit accepts an access from the e-paper via the wireless network; specifies corresponding records in the delivery schedule database and in the delivery content database as display schedule information, according to the e-paper ID transmitted from the e-paper at the time of the access; specifies, in the content database, contents specified in the delivery schedule information; and then transmits the display schedule information and the contents to the e-paper.

Alternatively, a content delivery server of the present invention includes a transportation object database, a content database, a designation receiving unit, an interval-period computing unit, a content setting unit and a delivery processing unit. The transportation object database stores attribute information on a transportation object and attribute information on the e-paper mounted on the transportation object in association with each other. The content database stores contents to be displayed on the e-paper. The designation receiving unit receives schedule designation information from an input interface, and then stores this information in the content/schedule information database. Here, the schedule designation information includes the attribute information on the e-paper mounted on the transportation object, attribute information on the contents for display on the e-paper, and information on time frames each for displaying content on the e-paper. The interval-period computing unit reads the schedule designation information from the content/schedule information database; computes a display period in each time frame according to information on display time frames included in the schedule designation information; and stores the computed display period as a content display period, in the delivery schedule database in association with the display time frame. The content setting unit stores, in the delivery content database, the attribute information on each of the contents designated in the schedule designation information and information on the display time frame in association with each other. The delivery processing unit accepts an access from the e-paper via a wireless network; specifies, as display schedule information, corresponding records in the delivery schedule database and in the delivery content database according to the e-paper ID transmitted from the e-paper at the time of the access; specifies contents in the content database specified in the display schedule information; and transmits the display schedule information and the contents to the e-paper.

In addition, an e-paper of the present invention is the one mounted on a transportation object, and includes: a clock function unit for computing an arrival of a date and time; a wireless communication unit; a content storage unit for storing contents for display; a schedule storage unit for storing the display schedule of the contents; a data obtaining unit; and a display processing unit. The wireless communication unit performs processing for data communications with the content delivery server by accessing a wireless network. The data obtaining unit detects an arrival of a predetermined date and time by using the clock function unit; makes a request to the content delivery server accessed via the wireless communication unit, for contents for display and display schedule information of the contents for display; and then stores the contents and the display schedule information, which are obtained from the content delivery server by making the request, in the content storage unit and in the schedule storage unit, respectively. The display processing unit performs processing for reading the contents from the content storage unit according to the display schedule in the schedule storage unit, and information on the arrival of the date and time detected by the clock function unit. Then, the display processing unit performs processing for switching the contents from one to another to be output on a display panel according to the display schedule. Note that the display panel of the e-paper largely consumes power for the output switching processing, but consumes very little power while displaying the contents.

In addition to the foregoing summary, the objects and solutions disclosed in the present invention will be clearly described by using the preferred embodiment and the accompanying drawings.

The present invention allows a PULL type display medium apparatus to obtain contents at a set timing, and to display the obtained contents while saving power. Thus, the present invention makes it possible to achieve an efficient and low-cost processing for switching contents on a content display according to a travel area, a time frame and a vehicle attribution of a transportation object.

BRIEF DESCRIPTION OF THE DRAWINGS

FIGS. 2A and 2C are diagrams each showing a data structure example 1 in this embodiment;

FIGS. 3A and 3B are diagrams each showing a data structure example 2 in this embodiment;

FIGS. 4A to 4D are diagrams each showing a data structure example 3 in this embodiment;

DETAILED DESCRIPTION OF THE INVENTION

System Configuration

Figure 1:
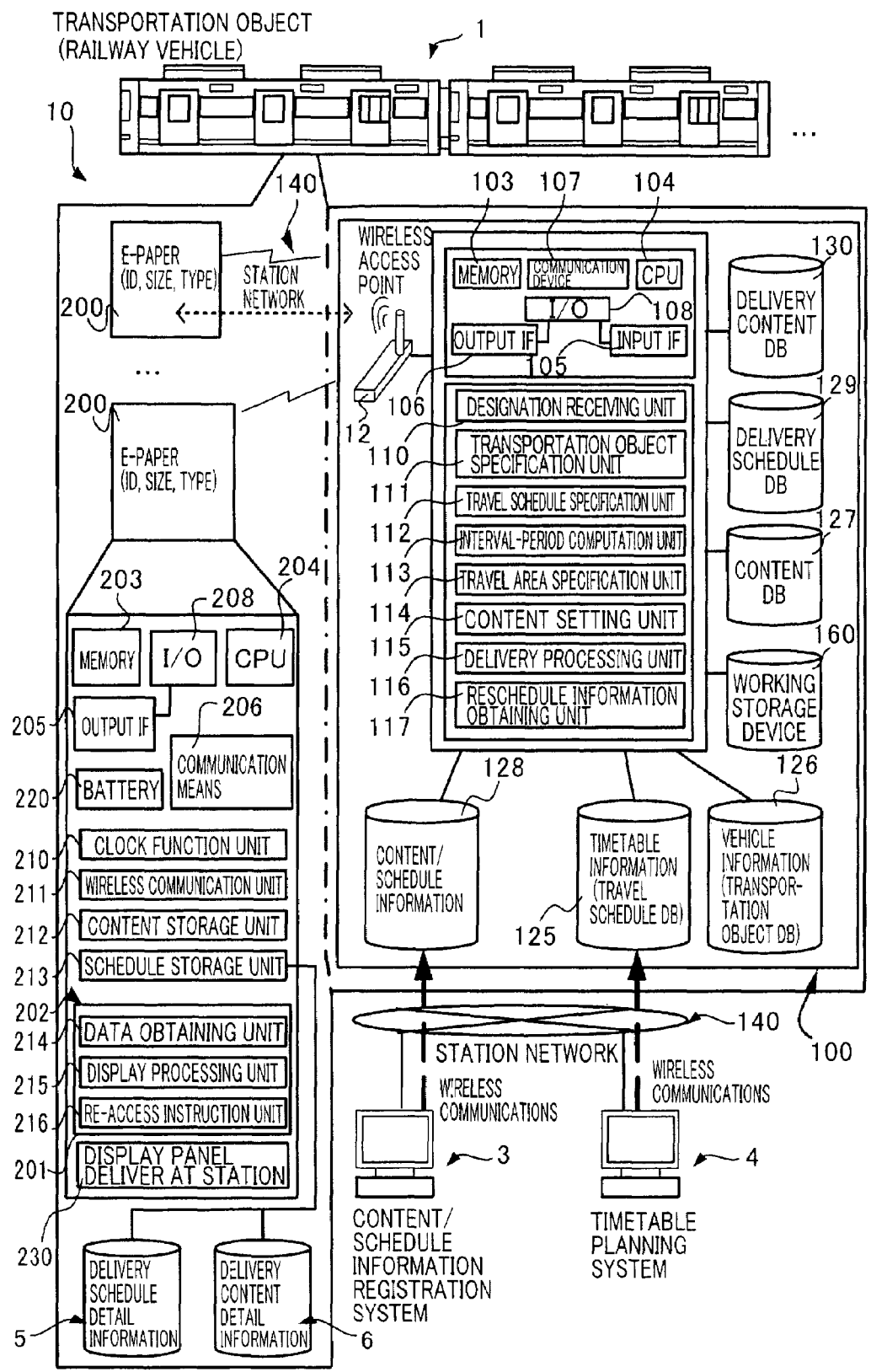
FIG. 1 is a diagram of a network structure including a content delivery system in this embodiment.

Hereinafter, descriptions will be given in detail of an embodiment of the present invention by using the accompanying drawings. FIG. 1 is a diagram showing a network configuration including a content delivery system 10 of this embodiment. The content delivery system 10 (hereinafter, referred to as the system 10) is a system consisting of a content delivery server 100 and an e-paper 200. The content delivery server 100 included in this system 10 may be installed, for example, in a transportation object (for instance, a railway vehicle, a bus, a taxi, an airplane, a ship and the like) 1, or installed together with an wireless access point 12 anywhere along a travel route (for instance, a part of a railway track or a railway station, a bus station, an airport and a harbor). In the case of installing the delivery server 100 along the travel route, particularly, a garage or a depot may be a desired installation location. If the content delivery server 100 is installed in a depot, the content delivery server 100 can deliver contents to the e-paper 200 more reliably, because the transportation object 1 provided with the e-paper 200 would stay in the depot for a long time.

The e-paper 200 mounted on the transportation object 1 accesses this content delivery server 100 via the wireless access point 12, and thus obtains information related to the content and a display schedule thereof. The content delivered by the content delivery server 100 may include news, notices from companies and public agencies, a traveling state of the transportation object 1, in addition to ad-information for products, services and the like.

Moreover, as a functional configuration of the content delivery server 100, in order to provide functions of implementing the content delivery method of the present invention together with the e-papers 200, the content delivery server 100 includes a program 102 stored in a program database 101 in a rewritable memory or the like. In the content delivery server 100, the program 102 is read out to a memory 103, and a CPU 104, which is an arithmetical device, executes the program 102.

In addition, the content delivery server 100 also includes an input interface 105 such as various kinds of buttons, an output interface 106 such as a display, a communication device 107 for sending and receiving data to and from external apparatuses such as the e-papers 200, and the like. For, example, the content delivery server 100 is connected to each of various wireless networks 140, such as a wireless LAN, through a wireless access point 12, and sends and receives data to and from the external apparatuses such as the e-papers 200 by using the communication device 107. An I/O unit 108 buffers data, and performs various intermediate processing between each functional unit of the content delivery server 100 and the communication device 107.

Hereinafter, descriptions will be given of functional units which the content delivery server 100 included in the system 10 configures and maintains, for example, according to the program 102. Note that the content delivery server 100 can use timetable information 125, vehicle information 126 and a content database 127. Here, the timetable information 125 is a travel schedule database storing information on scheduled travel times according to which the transportation object 1 is to travel along the travel route. The vehicle information 126 is a transportation object database storing attribute information on the transportation object 1 and attribute information on each of the e-papers 200 installed in the transportation object 1, relating each information with the other. The content database 127 stores contents to be displayed on the e-papers 200.

Note that, in a case where the transportation object 1 is a railway vehicle, the timetable information 125 can be obtained by the content delivery server 100, for example, from a timetable planning system 4 installed in a station through a station network 140.

This content delivery server 100 further includes an designation receiving unit 110 which receives schedule designation information from the input interface 105, and which stores this information in a content/schedule information database 128. The schedule designation information includes the attribute information on the e-papers 200 installed in the transportation object 1, the attribute information on the contents to be displayed on the e-papers, and information on display areas of the contents corresponding to a travel area of the transportation object 1. The schedule designation information may be input from a content/schedule information registration system 3 used, for example, by an advertising client who desires to deliver content, or by an administrator of the content delivery server 100. Then, the schedule designation information may be transmitted to the content deliver server 100 installed on the currently-traveling transportation object 1 through the station network 140.

From the input interface 105, the designation receiving unit 110 receives the schedule designation information, and then stores this information in the content/schedule information database 128. The schedule designation information includes the attribute information on the e-papers 200 installed in the transportation object 1, the attribute information on contents for display on the e-papers, and information on time frames for displaying contents in the e-papers 200. In addition, the designation receiving unit 110 performs processing for receiving an instruction for specifying stations where the transportation object will stop from the content/schedule information registration system by using the input interface 105 according to the timetable information, when performing processing for computing a rescheduling time.

Moreover, the content delivery server 100 includes a transportation object specification unit 111. The transportation object specification unit 111 reads the schedule designation information from the content/schedule information database 128, and performs processing for specifying the transportation object 1 in the transportation object database 126 according to the attribute information of each of the e-papers 200 included in the schedule designation information. Then, in a working storage device 160, the transportation object specification unit 111 stores the attribute information of the thus specified transportation object 1.

In addition, the content delivery server 100 includes a travel schedule specification unit 112. The travel schedule specification unit 112 reads the attribute information of the transportation object 1 specified in the specification processing, from the working storage device 160; reads information on display areas designated for this transportation object 1 in the schedule designation information; and performs processing for extracting scheduled travel times corresponding to the display areas in the travel route in the travel schedule database 125. Then, in the working storage device 160, the travel schedule specification unit 112 stores information on the scheduled travel times which correspond to the display areas, and which are extracted in the above extraction process.

Furthermore, the content delivery server 100 includes an interval-period computing unit 113. The interval-period computing unit 113 reads the information on the scheduled travel times corresponding to the display area, from the working storage device 160; and calculates the difference between the scheduled travel times. Then, in a delivery schedule database 129, the interval-period computing unit 113 stores information on this difference, as a content display period, in association with the display area.

Note that the interval-period computing unit 113 may read the schedule designation information from the content/schedule information database 128; compute a display time of each of the display time frames according to information on display time frames included in the schedule designation information; and store the computed display time as a content display period in association with the display time frame in a delivery schedule database 129.

Moreover, the content delivery server 100 includes a travel area specification unit 114. The travel area specification unit 114 reads, from the working storage device 160, the attribute information of the transportation object 1 specified in the specification process, and reads, from the content/schedule information database 128, information on display areas designated for this transportation object 1 in the schedule designation information. Then, the travel area specification unit 114 performs processing for extracting travel areas in the travel route which are stored in the travel schedule database 125, and which correspond to the display areas, and stores, in the working storage device 160, the information on the travel areas corresponding to the display areas extracted in the above extraction processing.

In addition, the content delivery server 100 includes a content setting unit 115. The content setting unit 115 reads the information on the travel areas from the working storage device 160, and stores the read-out information in a delivery content database 130 in association with the attribute information on the contents designated in the schedule designation information.

Alternatively, the content setting unit 115 may store, in the delivery content database 130, the attribute information on the contents designated in the schedule designation information and the information on the display time frames thereof (the order of displaying the contents) in association with each other.

Furthermore, the content delivery server 100 includes a delivery processing unit 116. The delivery processing unit 116 accepts an access from each of the e-papers 200 through the wireless network 140, and specifies, as display schedule information, corresponding records stored in the delivery schedule database 129 and in the delivery content database 130, according to an e-paper ID transmitted from each of the e-papers 200 at the time of the access. Then, the delivery processing unit 116 specifies, in the content database 127, contents corresponding to the contents specified in the display schedule information, and transmits the display schedule information and the contents to the concerned e-paper 200.

In addition, the content delivery server 100 includes a rescheduling information obtaining unit 117. The rescheduling information obtaining unit 117 receives information on the rescheduling time by accessing the content delivery server 100 from each of the e-papers 200 via the input interface 105, and stores this received information in association with the concerned e-paper 200, in the delivery schedule database 129. Instead, the rescheduling information obtaining unit 117 may compute a rescheduling time according to the timetable information, and may store the computed value in the delivery schedule database 129. Note that the rescheduling time is a time (step 20 in FIG. 5) at which the e-paper 200 makes a request for contents/schedule to the content delivery server 100, and that a reschedule interval is a time period from a time when the e-paper 200 receives contents and the like from the content delivery server 100 (steps 23 and 24 in FIG. 5), to a time when the e-paper 200 makes a request for contents/schedule to the content delivery server 100. Each of the rescheduling time and the rescheduling interval is information on a time used for determination in step 20 shown in FIG. 5, and their functions are identical.

Hereinafter, descriptions will be given of the e-papers 200 constituting the system 10. Each of the e-paper 200 is installed in the transportation object 1 such as a railway vehicle or a bus. In the e-paper 200, a program 202 stored in a program database 201, such as a rewritable memory, is read out to a memory 203, and the program 202 is executed by a CPU 204, which is an arithmetic device, for the purpose of implementing a function of performing processing according to the content delivery method of the present invention together with the content delivery server 100.

The e-paper 200 includes an output interface 205 for a display or the like, a communication device 206 and the like. The communication device 206 has a function of giving and receiving data to and from an external apparatus such as the content delivery server 100. In the present invention, this communication device 206 is hardware controlled by a wireless communication unit which executes wireless communications with the content delivery server 100. In addition, the e-paper 200 is connected to each of the various wireless networks 140 through the wireless access point 12 by using the communication device 206, and gives and receives data to and from the external apparatuses such as the content delivery server 100. An I/O unit 207 buffers data, and performs various intermediate processing between each functional unit of the e-paper 200 and the communication device 206.

Hereinafter, descriptions will be given of functional units which the e-paper 200 constituting the system 10 configures and maintains, for example, according to the program 202. The e-paper 200 includes a clock function unit 210, a wireless communication unit 211, a content storage unit 212, and a schedule storage unit 213. The clock function unit 210 computes an arrival of a date and time. The wireless communication unit 211 performs processing for data communications with the content delivery server 100, which delivers contents, by accessing the wireless network 140. The content storage unit 212 stores contents for display. The schedule storage unit 213 stores a display schedule of the contents.

Moreover, the e-paper 200 includes a data obtaining unit 214. The data obtaining unit 214 detects an arrival of a predetermined date and time which is set in advance according to a rescheduling time (interval), by using the clock function unit 210, and makes a request for contents for display and the display schedule information of the contents for display, to the content delivery server 100 which is accessed via the wireless communication unit 211. Then, the data obtaining unit 214 stores the contents and the display schedule information, which are obtained by making the request to the content delivery server 100, in the content storage unit 212 and the schedule information storage 213, respectively.

In addition, the e-paper 200 includes a display processing unit 215. The display processing unit 215 executes processing for reading the content from the content storage unit 212 according to the information on the display schedule stored in the schedule storage unit 213 and on the arrival date and time detected by the clock function unit 210. Thereafter, according to the display schedule, the display processing unit 215 performs processing for switching the contents thus read in the above reading processing from one to another to be output from the display panel 230.

Additionally, the e-paper 200 may include a re-access instruction unit 216. The re-access instruction unit 216 detects, by using the clock function unit 210, an arrival of the rescheduling time on the basis of information on the rescheduling time included in the display schedule information which is obtained from the content delivery server 100, and issues an instruction to the data obtaining unit 214 to access the content delivery server 100.

Note that each of the functional units 110 to 117 of the content delivery server 100 and each of the functional units 210 to 216 of the e-paper 200, which constitute the system 10, may be implemented as hardware, or as programs stored in an appropriate storage device such as a memory or a HDD (Hard Disk Drive). In the latter case, each of the CPUs of the content delivery server 100 or of the e-paper 200 reads the programs to a memory from the storage device, and executes the read-out programs in line with the progress of program execution.

The e-paper 200 has a power-saving feature, which is a feature of e-paper. To be more precise, the e-paper 200 consumes battery power largely only when changing a screen display to another one, and consumes very little battery power when not changing a screen display to another one. In order to maximize this feature, the power is usually supplied only to functions used for changing displays, and not to communication means and the like. Accordingly, the communication means and the like are usually out of operation. In other words, the e-paper 200 has a mechanism in which the power is supplied only to the functions (the clock function unit 210, the display processing unit 215 and the like) needed for displaying and switching contents in steps 24 to 29 in FIG. 1 when the e-paper 200 displays and switches the contents. The power is supplied to the communication means and the like only when the e-paper 200 communicates with the content delivery server 100.

Database Structure

Hereinafter, descriptions will be given of data structures respectively of the travel schedule database 125, the transportation object database 126, the content database 127, the content/schedule information database 128, the delivery schedule database 129 and the delivery content database 130 used by the content delivery server 100 constituting the system 10 of this embodiment.

FIGS. 2A to 2C are diagrams showing data structure examples 1 of the databases in this embodiment. As shown in FIG. 2A, the timetable information 125, which is the travel schedule database, is a collection of records in each of which station information, and information on an arrival time (an arrival time at a station), a departure time (a departure time from the station) are associated with one another by using a train number as a key. In the timetable information 125, in which the station information, an arrival time, and a departure time are associated with one another by using a train number as the key, the first line indicates information on the first station at which a concerned transportation object makes a stop for the first time after departure from a train deposit, and the last line indicates information on the last station at which a concerned transportation object makes a stop immediately before returning to the train deposit. Moreover, in the timetable information, flags may be added to the lines indicating the first and last stations.

As shown in FIG. 2B, the transportation object database 126, which is the transportation object database, is a collection of records in each of which information on a vehicle number and information on an (installed) e-paper ID are associated with each other by using a train number as a key. As shown in FIG. 2C, the content database 127 stores contents to be displayed on each of the e-papers 200, and is a collection of records in each of which data on an attribute 1 (e.g., color attribute), an attribute 2 (e.g., size), and a file are associated with one another by using, for example, a content name.

FIGS. 3A and 3B are diagrams showing data structure examples 2 of the databases in this embodiment. Data formats of the content/schedule information database 128 will be explained as follows. In terms of the formats of the content/schedule information database 128, it is possible to suppose two cases, where contents to be displayed are input for each time frame as shown in FIG. 3A, and where contents to be displayed are input for each transportation area of a vehicle. Here, information in the former case is called content/schedule information (time frame), and information in the latter case is called content/schedule information (area).

As shown in FIG. 3A, the content/schedule information (time frame) is a collection of records in each of which a display time frame and attribute information (a content name) on content are associated with each other by using an e-paper ID as a key. Here, for each of the e-papers 200, display time frames need to correspond to contents one by one. In contrast, as shown in FIG. 3B, in the content/schedule information (area), a display area and attribute information (content names) on content are stored by using an e-paper ID as a key. Here, for each e-paper 200, display areas need to correspond to contents one by one.

FIGS. 4A to 4D are diagrams showing data structure examples 3 of the databases in this embodiment. The delivery schedule database 129 and the delivery content database 130 will be explained as follows. The delivery schedule database 129 is a collection of records in each of which information on a rescheduling time (or a reschedule interval) and information on a display period (of content) are associated with each other by using, as a key, an e-paper ID of an e-paper which is to display the content. A plurality of display periods may be associated with one e-paper ID.

The delivery content database 130 is a collection of records in each of which the size (of content), the type (of the content) and attribute information (such as the content name) on the content are associated with one another by using an e-paper ID of an e-paper which is to display the content. A plurality of pieces of the attribute information of content may be set for one e-paper ID. In this case, all the sizes and types of contents for one e-paper ID should be identical to one another.

Processing Flow Example 1

Hereinafter, descriptions will be given of examples of an actual procedure of the content delivery method in this embodiment by using the drawings. Note that each of the below-described operations according to the content delivery method are implemented by means of each of programs which are read to an appropriate memory, and which are thus executed by the content delivery server 100 and thee-paper 200 constituting the system 10. Each of the programs is configured of codes for executing the below-described operations. In addition, an example of the transportation object 1 is supposed to be a railway vehicle. Then, suppose that the e-paper 200 is installed inside or outside this railway vehicle, and that the e-paper 200 displays, by using the display panel 230, contents such as ad-information delivered from the content delivery server 100. Consequently, passengers in the railway vehicle, or people viewing the railway vehicle from outside look at advertisements and the like which the e-paper 200 displays by switching the advertisement from one to another at good timings.

Figure 5:
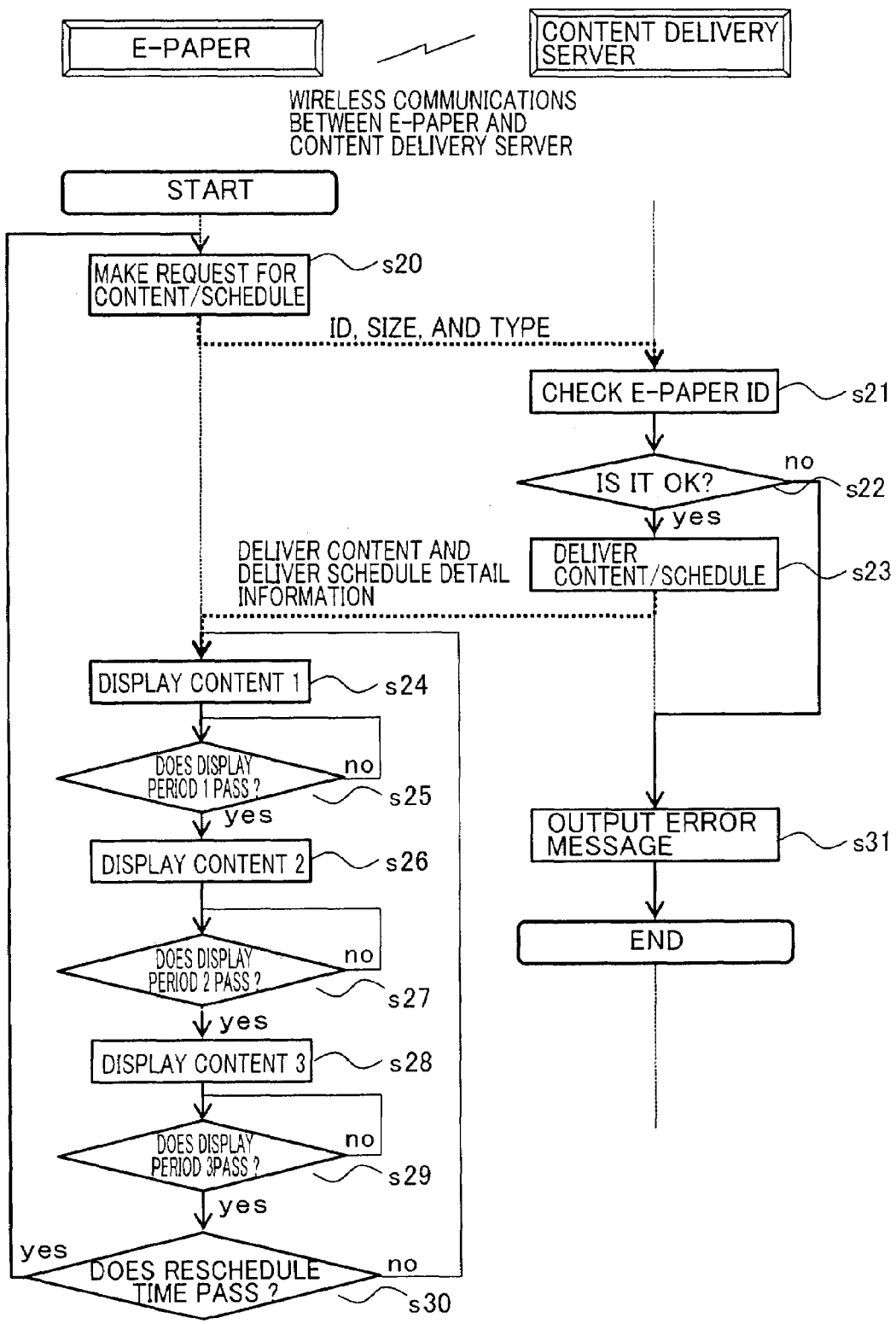
FIG. 5 is a flowchart showing a procedure example 1 in the content delivery method of this embodiment.

Hereinafter, descriptions will be given of a main flow in the content delivery method in this embodiment. FIG. 5 is a flowchart showing a procedure example 1 of the content delivery method in this embodiment. The flow shown in FIG. 5 shows a case where the e-paper 200 obtains contents and a display schedule from the content delivery server 100 in the content delivery system 10, and where then the e-paper 200 displays the contents according to this schedule. In this case, the data obtaining unit 214 in the e-paper 200 detects an arrival of a predetermined date and time, for example, by using the clock function unit 210, and accesses the wireless network 140 via the wireless communication unit 211. Then, the data obtaining unit 214 makes a request to the content delivery server 100 for contents for display and delivery schedule information on the contents for display (s20). Note that, in a case where the e-paper 200 transmits a request for contents/schedule to the content delivery server 100 at the beginning, that is, before contents and information on a rescheduling time are transmitted from the content delivery server 100, the e-paper 200 transmits the request either in response to a certain instruction issued to the e-paper 200, or at a time specified by an instruction, which is stored in advance in the e-paper 200, to obtain contents.

Meanwhile, the delivery processing unit 116 in the content delivery server 100 accepts an access from each of the e-papers 200 through the wireless network 140, and checks the e-paper ID transmitted from the e-paper 200 at the time of the access (s21). In the event of checking the e-paper ID, firstly, the size (of content) and the type (of the content) are checked by using the ID of the e-paper 200, and then it is confirmed that content to be obtained is an appropriate image file which can be displayed by the e-paper 200. For this purpose, the delivery processing unit 116 in the content delivery server 100 specifies, as the display schedule information, corresponding records in the delivery schedule database 129 and the delivery content database 130, according to this e-paper ID. The delivery processing unit 116 also specifies, in the content database 127, contents corresponding to the contents specified in the display schedule information. The delivery processing unit 116 determines whether the size and type (color characteristics or the like) of the content thus specified can be displayed by using the specifications of the e-paper 200 (s22). Note that the information on the specifications of each of the e-papers 200 is previously provided to the memory 103 or the like in the content delivery server 100 for the purpose of performing this process.

If this determination result is negative (s22: no), the delivery processing unit 116 outputs an error message to the e-paper 200 (s31), and terminates the process. In contrast, if the determination result is affirmative (s221: yes), the delivery processing unit 116 creates delivery schedule detail information and delivery content detail information, and transmits the two kinds of information thus created, to the e-paper 200 (s23). Descriptions will be given later of the processing for creating the delivery schedule detail information and the delivery content detail information.

Meanwhile, the data obtaining unit 214 of the e-paper 200 stores the content transmitted from the content delivery server 100, in the content storage unit 212, and stores the delivery schedule information in the schedule storage unit 213. In addition, the display processing unit 215 of the e-paper 200 performs processing for reading the corresponding contents from the content storage unit 212 according to information on the display schedule in the schedule storage unit 213 and information on the arrival of a predetermined date and time detected by the clock function unit 210, and performs processing for switching the contents from one to another to be output on the display panel 230 according to the display schedule.

To be more precise, for example, the display processing unit 215 causes content 1 scheduled to be displayed first among the transmitted contents, to be displayed (s24). When the display time based on the display schedule passes (s25: yes), the next content 2 is displayed (s26). Then, when the display time further passes (s27: yes), the next content 3 is displayed (s28). The display processing unit 215 repeats this processing until a time period up to the rescheduling time passes (s27). Upon arrival of the rescheduling time (s30: yes), the data obtaining unit 214 again accesses the content delivery server 100, and newly obtains contents and delivery schedule information (s30). This processing is carried out as follows. Firstly, the re-access instruction unit 216 of the e-paper 200 detects the arrival of the rescheduling time by using the clock function unit 210, according to the information on the rescheduling time which is included in the display schedule information obtained from the content delivery server 100. Then, the re-access instruction unit 216 issues an instruction to the data obtaining unit 214 to access the content delivery server 100.

Incidentally, a re-access time may be determined as follows. Firstly, a time of regular switching of advertisements (for example, once a day) is determined in advance for each travel route included in the timetable information 125. Then, the re-access time is determined by following a time interval of the regular switching.

Processing Flow Example 2

Hereinafter, descriptions will be given of the processing in which the content delivery server 100 creates the delivery schedule detail information 5 and the delivery content detail information 6. These delivery schedule detail information 5 and delivery content detail information 6 are transmitted from the content delivery server 100 to each e-paper 200, and then are used as data constituting the schedule of displaying contents in the e-paper 200.

Figure 6:
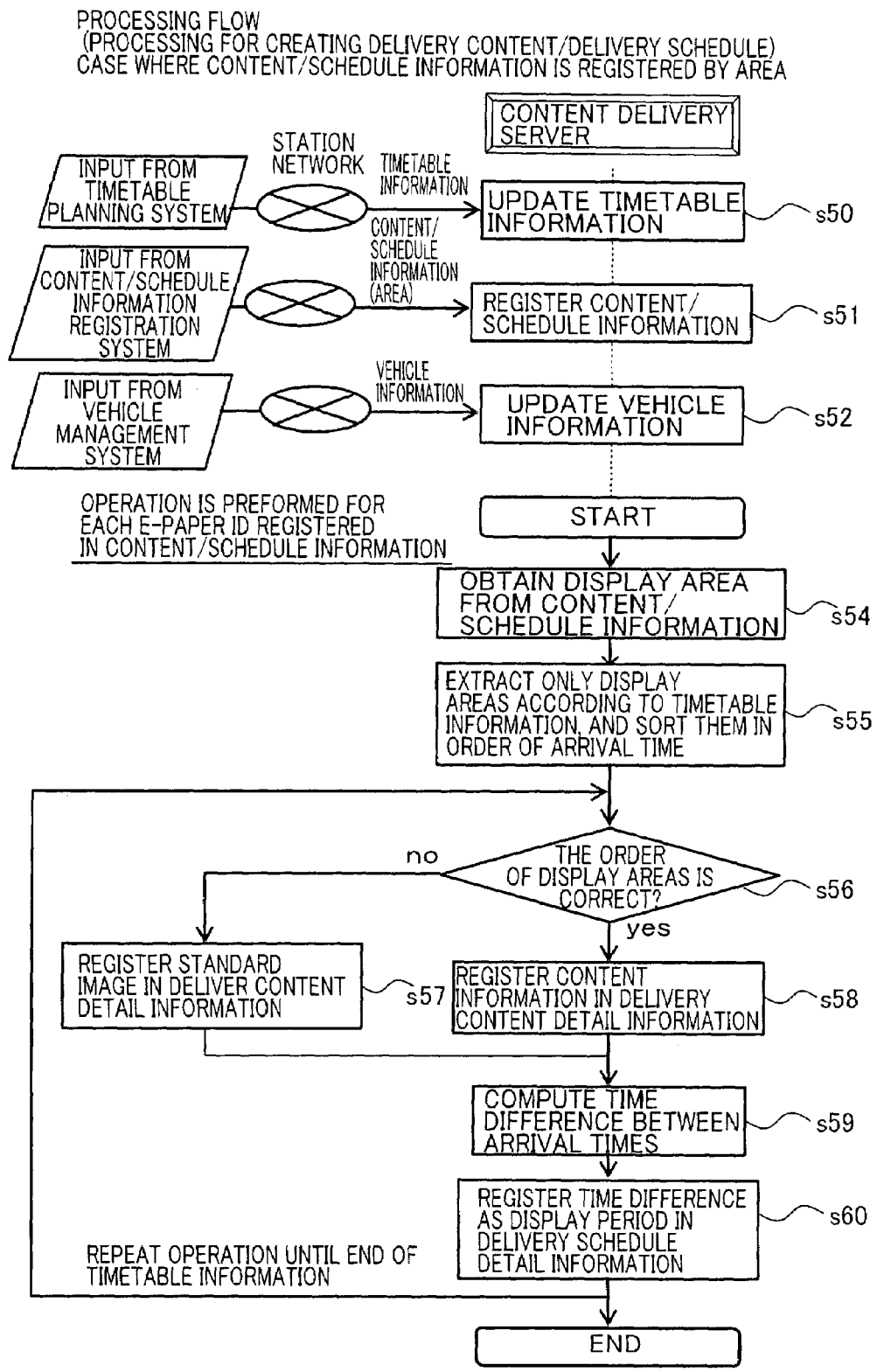
FIG. 6 is a flowchart showing a procedure example 2 in the content delivery method of this embodiment.
Figure 7:
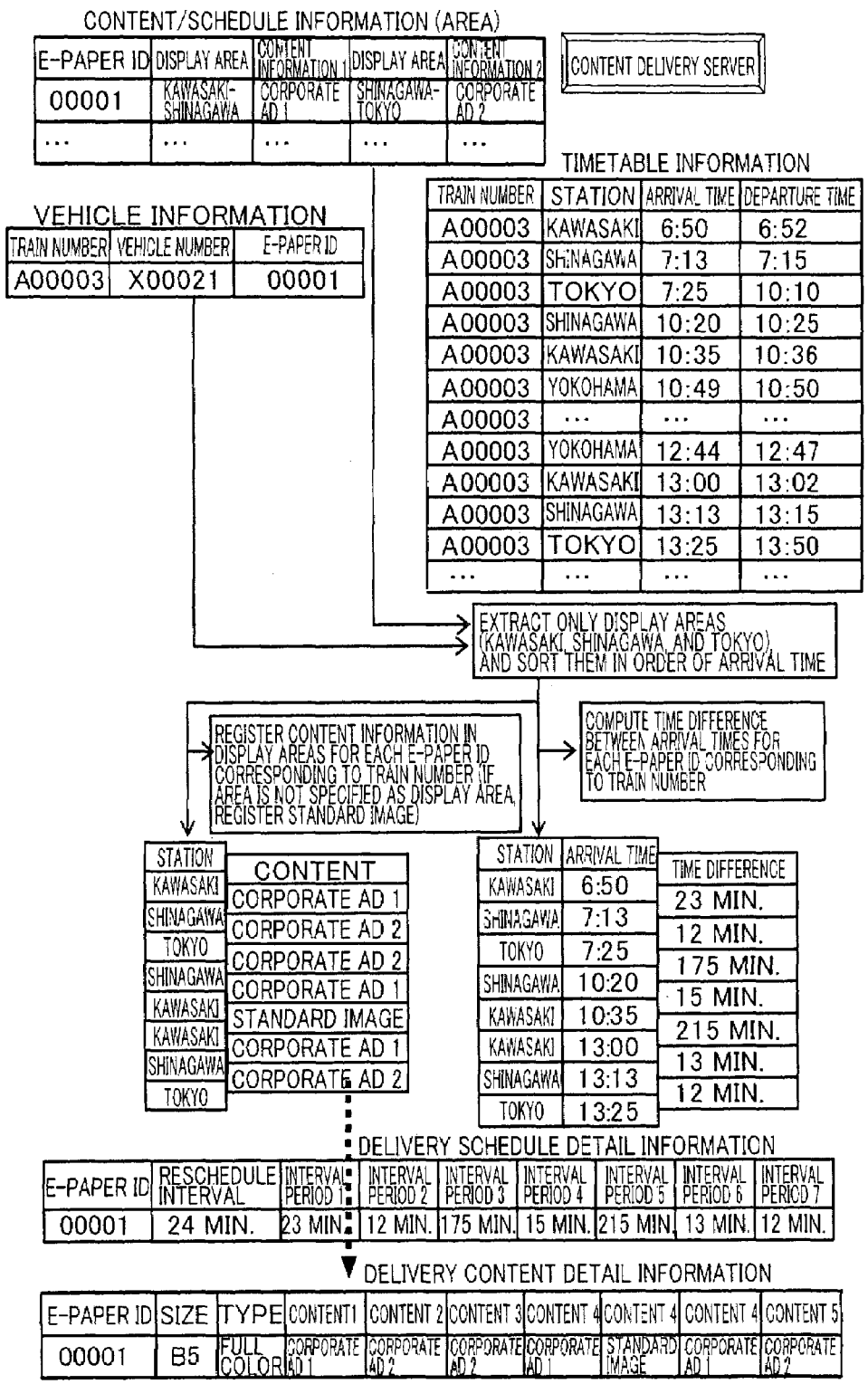
FIG. 7 is a flowchart showing a specific example of the procedure example 2 in the content delivery method of this embodiment.
Figure 8:
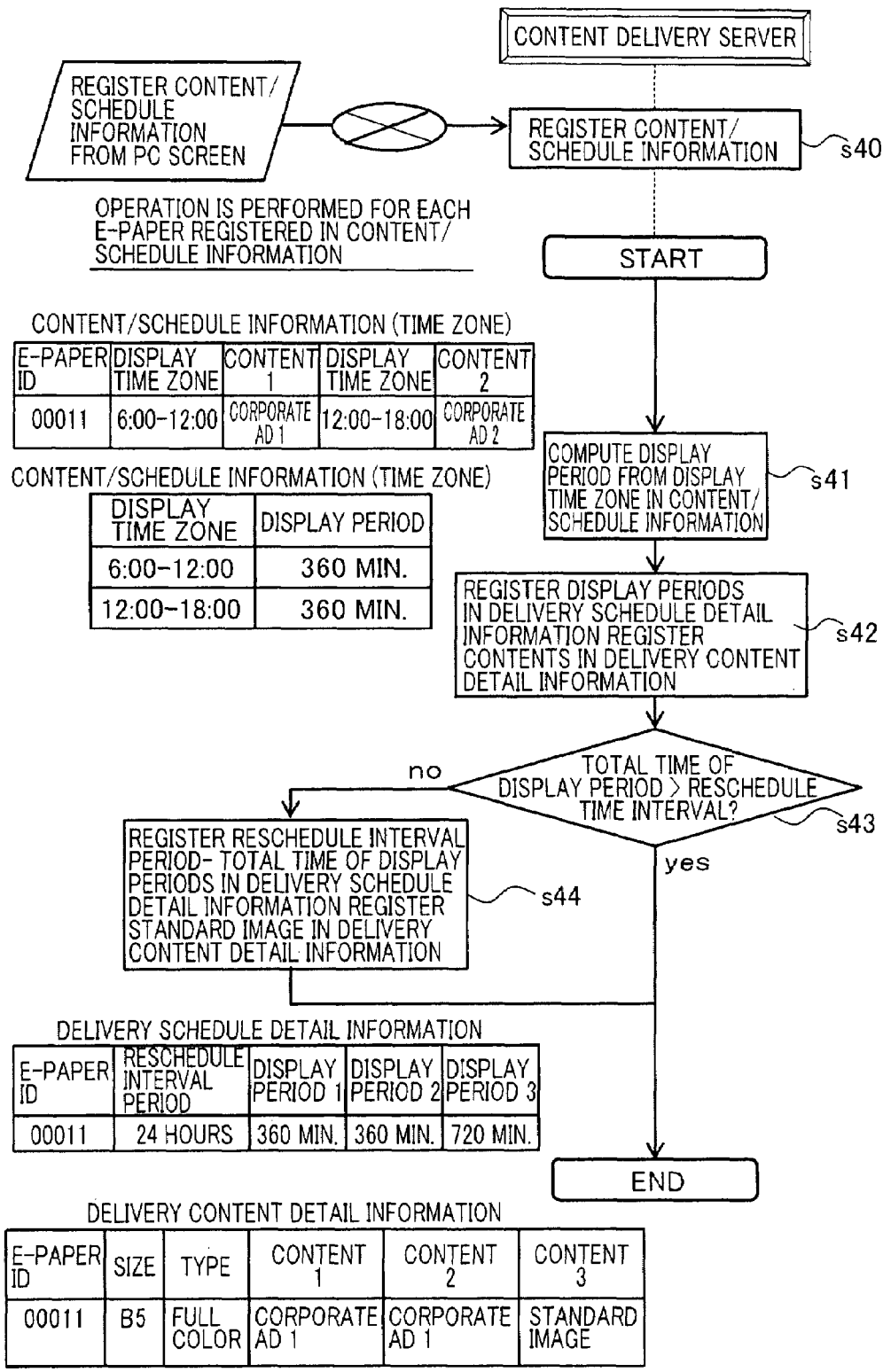
FIG. 8 is a flowchart showing a procedure example 3 in the content delivery method of this embodiment.

A procedure example 2 is described in FIGS. 6 and 7, and a procedure example 3 is described in FIG. 8. A difference between the procedure examples 2 and 3 is that a display period is determined by using areas based on the timetable information in the procedure example 2, while the display period is determined by using time in the procedure example 3.

FIG. 6 is a flowchart showing the procedure example 2 in the content delivery method of this embodiment. This is a processing flow for creating the delivery schedule detail information 5 and the delivery content detail information 6 in a case where content/schedule information is input in association with a display area, from the content/schedule information registration system 3. FIG. 7 shows an image of specific processing of the processing flow example 2.

Here, the content delivery server 100 is supposed to previously complete updating the timetable information 125 which is obtained from another sub-system such as the timetable planning system 4 (s50), and to previously complete updating the vehicle information 126 which is obtained from another sub-system such as a vehicle management system for railway vehicles (s52). In addition, a person such as an advertising client or an administrator of the content delivery server 100, who registers content, transmits the content together with information on a display area (of the content). Here, it is possible to transmit a plurality of contents and display areas. In this case, the contents should correspond to the display areas one by one.

Meanwhile, the designation receiving unit 110 of the content delivery server 100 receives an input of the schedule designation information from the input interface 105, and stores this information in the content/schedule information database 128 (s51). Here, the schedule designation information includes the attribute information on each e-paper 200 installed in the transportation object 1, the attribute information on contents to be displayed on the e-paper, and information on the display areas of the contents corresponding to the travel areas of the transportation object 1. The schedule designation information may be input from the content/schedule information registration system 3 used by, for example, an advertising client who desires to deliver content, or an administrator of the content delivery server 100. Then, the schedule designation information maybe transmitted through the station network 140 to the content delivery server 100 installed in the currently traveling transportation object 1, or in a station. In the example shown in FIG. 7, there are two display areas in the content/schedule information that are a display area from Kawasaki to Shinagawa, and a display area from Shinagawa to Tokyo. Meanwhile, the number of display areas may be more than one or only one.

A rescheduling time (interval) in the delivery schedule database is set as follows. Firstly, designation of information on a display area (for example, a train number and station information included in the timetable information shown in FIG. 2) is received from the content/schedule information registration system. Then, the content delivery server extracts arrival times and departure times at specified stations by using the timetable information, and thus uses the extracted times for setting the rescheduling time.

In another method for setting the rescheduling time, instead of receiving the designation from the content/schedule information registration system, the content delivery server may extract an arrival time and a departure time at each station (or a flagged station of which is supposed to deliver content and the like) from the timetable information, and may set a rescheduling time by using the extracted times.

Alternatively, it is also possible to extract, from the timetable information, a return time at which each train enters the deposit, that is, a departure time on the last line in the timetable information on each train. Thereby, a rescheduling time can be set to be a time after the return time. In this case, a set of contents can be replaced with another set in the deposit.

When a rescheduling time is set by using the timetable information of a train as described in the above methods, it is possible to supply and display contents appropriate for a route, a time frame and a transportation area of a train.

In still another method for setting a rescheduling time, information on a rescheduling time may be received from the content/schedule information registration system. Note that the rescheduling information obtaining unit 117 extracts and determines a rescheduling time, and stores the rescheduling time in the delivery schedule database 129. In the procedure example 3A, a rescheduling time is set in the same manner as described above.

In addition, it is preferable that the rescheduling information obtaining unit 117 in the content delivery server 100 receive, from the content/schedule information registration system 3 or the like, information on a time at which each e-paper 200 accesses the content delivery server 100 next time, and store the received information in the delivery schedule database 129 in association with the e-paper 200.

Subsequently, the content delivery server 100 performs the following processing for each e-paper ID included in information registered in the content/schedule information database 128. The transportation object specification unit 111 in the content delivery server 100 reads the schedule designation information from the content/schedule information database 128, and performs the processing for specifying a railway vehicle 1 from the vehicle information 126 according to the ID of the e-paper 200 included in the schedule designation information. Then, the transportation object specification unit 111 stores the attribute information (train number and vehicle number) on the railway vehicle 1 specified in the above processing, in the working storage device 160.

Then, the travel schedule specification unit 112 in the content delivery server 100 reads the attribute information on the railway vehicle 1 specified in the above specification processing, from the working storage device 160, and reads information on display areas designated for this railway vehicle 1 with the schedule designation information from the content/schedule information database 128 (s54). Thereafter, the travel schedule specification unit 112 performs processing for extracting scheduled travel times (arrival-and-departure times at each of corresponding stations) corresponding to the display areas in the travel route (a group of stations which the railway vehicle arrives at and departs from), and then stores, in the working storage device 160, information on the scheduled travel times which are extracted in the above extracting processing, and which correspond to the respective display areas.

When this processing is performed, the display areas, for example, extracted from the timetable information 125, that is, the arrival-and-departure stations of the railway vehicle are sorted in the order of the arrival times (s55). In a case where the order of the sorted arrival-and-departure stations is the correct order of the display areas which is absolutely consistent with the order of arrivals and departures of the railway vehicle in the timetable information 125 (s56: yes), the information of the corresponding contents are read out from the content database 127, and are registered in the delivery content detail information 6 (s58).

In contrast, in a case where the order is not the correct order of the display areas (s56: no), information on a predetermined standard image of an advertising client is read out from the content database 127 also for a travel area for which no content is registered, and is registered in the delivery content detail information 5 (s57). By performing this processing, some kind of content is always displayed in all areas. In the example shown in FIG. 7, there is no advertising client for travel areas (an area from Kawasaki to Kawasaki, and an area from Shinagawa to Shinagawa) that are riot designated as the display areas among the areas corresponding to display periods. Accordingly, by setting the standard image to be displayed for these areas, the delivery schedule detail information 5 and the delivery content detail information 6 are created so that a time frame when no content is displayed would not exist.

In addition, the interval-period computing unit 113 of the content delivery server 100 reads information on the scheduled travel times corresponding to the display areas, from the working storage device 160, computes the difference between two successive scheduled travel times, and stores the computed difference, as a content display period, in the delivery schedule database 129, in association with the display areas (s59). This processing is repeated up to the end of the timetable information.

The travel area specification unit 114 in the content delivery server 100 reads the attribute information of the transportation object 1 specified in the specification processing, from the working storage device 160, and then reads information on the display areas designated for this transportation object 1 with the schedule designation information from the content/schedule information database 128. Thereafter, the travel area specification unit 114 performs processing for extracting travel areas (information 700 shown in FIG. 7) in the travel route in the timetable information 125. Here, an extracted travel area is the one corresponding to each of the display areas. Then, the travel area specification unit 114 stores, in the working storage device 160, the information 700 on the travel areas which are extracted in the above extracting processing, and which correspond to the respective display areas.

The content setting unit 115 in the content delivery server 100 reads the information 700 on the travel areas, from the working storage device 160, and stores the information in the delivery content database 130 in association with the attribute information on the contents designated in the schedule designation information. In this way, the delivery schedule detail information 5 and the delivery content detail information 6 are created, and then stored in the delivery schedule database 129 and the delivery content database 130, respectively.

Processing Flow Example 3

FIG. 8 is a flowchart showing the procedure example 3 in the content delivery method of this embodiment. This is a processing flow for creating the delivery schedule detail information 5 and the delivery content detail information 6 in a case where content/schedule information is input in association with a display time frame, by using the content/schedule information registration system 3. Here, a person, who registers content, inputs in advance the content together with a display time frame (of the content) by using the content/schedule information registration system 3 or the like. In this event, it is possible to input a plurality of contents and display time frames. In this case, the contents should correspond to the display time frames one by one.

Meanwhile, the designation receiving unit 110 in the content delivery server 100 receives the input information via the network 140, and stores the received information in content/schedule information database 128 as the schedule designation information including the attribute information on each e-paper 200 installed in the transportation object 1, the attribute information on contents for display on the e-paper 200, and the information on the time frames when each of the contents is to be displayed on the e-paper 200 (s40).

In addition, it is preferable that the rescheduling information obtaining unit 117 in the content delivery server 100 receive, from the content/schedule information registration system 3 or the like, information on a rescheduling time at which the e-paper 200 accesses the content delivery server 100 next time, and store the received information in association with the e-paper 200 in the delivery schedule database 129.

Subsequently, the content delivery server 100 performs the following processing for each e-paper ID included in the information which is registered in the content/schedule information database 128. The interval-period computing unit 113 in the content delivery server 100 reads the schedule designation information from the content/schedule information database 128, and computes a display time of each display time frame according to the information on the display time frame included in the schedule designation information (s41). Then, in the delivery schedule database 129, the interval-period computing unit 113 stores the computed display time as the delivery schedule detail information 5 (S42). Here, the computed display time is regarded as a content display time, and is associated with the display time frame in the delivery schedule detail information 5. In the example shown in FIG. 8, the content/schedule information shows a display time frame of "6:00 to 12:00" for content 1, for example. Accordingly, the interval-period computing unit 113 computes that the display period is 6 hours, that is, 6×60 min.=360 min.

In the delivery content database 130, the content setting unit 115 in the content delivery server 100 stores, as the delivery content detail information 6, attribution information and the display time frame information on the content designated in the schedule designation information, in association with each other (s42).

Moreover, in a case where the total time of the display periods (e.g., 360+360=720 min., as in FIG. 8) in the delivery schedule detail information 5 is less than a time interval between two successive re-accesses (e.g., 24 hours., as in FIG. 8) (s43: no), the content delivery server 100 recognizes that an extra time for content display (e.g., 720 min., as in FIG. 8) remains, and sets a standard image in the delivery content detail information 6. In addition, the content delivery server 100 sets the time period calculated by using a formula, "the re-access interval period—the display periods" (e.g., 720 min., in FIG. 8) in the delivery schedule detail information 5, as the display time frame for this standard image (s44). In this way, the delivery schedule detail information 5 and the delivery content detail information 6 are created, and stored in the delivery schedule database 129 and the delivery content database 130, respectively.

According to the present invention, it is possible to create a content delivery schedule according to display areas of contents, display time frames of the contents and the like which are registered in advance by a person who registers the contents, by using information on a travel schedule (e.g.: train timetable information) of a transportation object 1 (e.g., a railway vehicle or a bus vehicle). Thereby, the thus created content delivery schedule can be delivered. Consequently, an e-paper can perform processing for displaying contents at appropriate areas and in appropriate time frames based on this schedule. Moreover, the attributes (monochrome or color, and the size) of content to be delivered are confirmed by using the ID of an e-paper. Thereby, only the appropriate content can be delivered to the e-paper.

Hence, the present invention makes it possible to achieve an efficient and low-cost processing for switching content displays from one to another appropriately for the transportation area, the time frame and a vehicle attribute of the transportation object 1.

Hereinabove, the present invention has been described in detail by using the embodiment. However, the present invention is not limited to this embodiment, and various modifications can be made within the spirit of the present invention.

What is claimed is:

1. A content display control method using a display medium apparatus which includes a display unit for displaying content and an I/O unit, and a content delivery server which includes a storage device for storing the content, comprising the steps of:

causing the content delivery server to compute a rescheduling time indicating a timing at which the display medium apparatus makes a request for the content to the content delivery server;

causing the content delivery server to store the computed rescheduling time in the storage device;

causing the content delivery server to transmit the rescheduling time and the content to the display medium apparatus when the content delivery server receives a content transmission request requesting transmission of the content;

causing the display medium apparatus to display the received content on the display unit; and causing the display medium apparatus to transmit, to the content delivery server, the content transmission request requesting transmission of the content upon arrival of a time determined according to the rescheduling time, wherein the display medium apparatus supplies power to the I/O unit at least upon arrival of the time determined according to the rescheduling time, and transmits the content transmission request from the I/O unit, the display medium apparatus is mounted on a transportation object;

the content delivery server stores, in the storage device, travel schedule information indicating information on a time when the transportation object stops for each of stop stations where the transportation object stops; and the rescheduling time is computed based on the travel schedule information.

2. The content display control method according to claim 1, wherein the rescheduling time is computed by extracting, from the travel schedule information, a stopping time when the transportation object stops at a station, and determining the extracted stopping time as the rescheduling time.

3. The content display control method according to claim 1, wherein:

the content delivery server is connected to a content/schedule registration system;

the content delivery server receives a designation of the stop station based on information on the stop station included in the travel schedule information, from the content/schedule registration system; and the rescheduling time is computed by extracting the stopping time of the designated stop station, from the travel schedule information, and determining the extracted stopping time as the rescheduling time.

4. The content display control method according to claim 1, wherein the rescheduling time is computed by extracting, from the travel schedule information, a time when the transportation object finishes traveling, and determining the extracted travel finishing time as the rescheduling time.

5. The content display control method according to claim 1, wherein:

the content delivery server is connected to a content/schedule registration system;

the content delivery server receives, from the content/schedule registration system, a plurality of contents and display period information indicating display periods of the respective contents;

the content delivery server determines the order of the contents to be displayed on the display unit of the display medium apparatus, based on the display period information;

the content delivery server stores the display period information and the order as delivery schedule detail information, relating them with the content; and when the content delivery server receives the content transmission request from the display medium apparatus, the content delivery server further transmits the display period information and the order corresponding to the content.

6. The content display control method according to claim 5, wherein:

the content delivery server stores, in the storage device, a database including areas and times in which the transportation object travels, in association with each other;

the display period information is area information based on the area included in the database; and the display period in the delivery schedule detail information is information on a time corresponding to an area determined according to the area information in the database.

7. The content display control method according to claim 5, wherein the display period is information including a time frame in which each of the contents is displayed.

8. The content display control method according to claim 7, wherein:

the content delivery server computes a total time by summing up the time frames of the plurality of received display periods;

the content delivery server compares the total time with the rescheduling time; and if the rescheduling time is longer than the total time, the content delivery server inserts a display schedule of a predetermined content in the delivery schedule detail information.

9. A content delivery server which is connected to a display medium apparatus including a display unit for displaying content, and an I/O unit, and which includes a storage device for storing the content and information on a transportation object where the display medium apparatus is mounted, comprising:

a rescheduling information obtaining unit for computing a rescheduling time defining a time when the display medium apparatus transmits a content transmission request, a storage unit which stores the computed rescheduling time in the storage device, a receiving unit which receives the content transmission request from the display medium apparatus, and a transmitting unit which transmits the rescheduling time and the content to the display medium apparatus when the content delivery server receives the content transmission request, wherein the display medium apparatus supplies power to the I/O unit at least upon arrival of the time determined according to the rescheduling time, and transmits the content transmission request from the I/O unit;

the display medium apparatus is mounted on a transportation object;

the storage device stores travel schedule information indicating information on a time when the transportation object stops for each of stop stations where the transportation object stops; and the rescheduling information obtaining unit computes the rescheduling time based on the travel schedule information.

10. The content delivery server according to claim 9, wherein the rescheduling information obtaining unit computes the rescheduling time by extracting, from the travel schedule information, a stopping time when the transportation object stops at a station, and determining the extracted stopping time as the rescheduling time.

11. The content delivery server according to claim 9, wherein the content delivery server is connected to a content/schedule information registration system;

the content delivery server further comprises an designation receiving unit for receiving a designation of the stop station based on information on the stop station included in the travel schedule information from the content/schedule information registration system;

the rescheduling information obtaining unit computes the rescheduling time by extracting a stopping time of the designated stop station from the travel schedule information, and determining the extracted stopping time as the rescheduling time.

12. The content delivery server according to claim 9, wherein the rescheduling information obtaining unit computes the rescheduling time by extracting, from the travel schedule information, a time when the transportation object finishes traveling, and determining the extracted travel finishing time as the rescheduling time.

13. The content delivery server according to claim 9, wherein
the content delivery server is connected to a content/schedule information registration system;
the content delivery server further comprises a content setting unit for determining the order of contents to be displayed on the display unit of the display medium apparatus, based on display period information indicating the display periods of the respective contents to be displayed on the display unit of the display medium apparatus;
the receiving unit further receives a plurality of contents and the display period information on each of the contents, as delivery schedule detail information, from content/schedule information registration system,
the storage unit further stores, in the storage device, the display period information and the order in association with the contents, and
when the content delivery server receives the content transmission request from the display medium apparatus, the transmitting unit further transmits the display period information and the order corresponding to the contents.

14. The content delivery server according to claim 13, wherein
a database including areas and times in which the transportation object travels, in association with each other is stored in the storage device;
the display period information is area information based on areas included in the database;
the display period in the delivery schedule detail information is information on a time corresponding to an area determined according to the area information in the database.

15. The content delivery server according to claim 13, wherein the display period is information including a time frame in which each of the contents is displayed.

16. The content delivery server according to claim 15, wherein
the content setting unit further computes a total time by summing up the time frames of the plurality of received display periods;
the content setting unit compares the total time period with the rescheduling time; and
when the rescheduling time is longer than the total time, the content delivery server inserts a display schedule of a predetermined content, in the delivery schedule detail information.

\* \* \* \* \*